(12) United States Patent
Shveidel et al.

(10) Patent No.: US 10,664,397 B2
(45) Date of Patent: May 26, 2020

(54) CACHE RECOVERY METHOD IN A DISTRIBUTED STORAGE SYSTEM

(71) Applicant: EMC IP Holding Company LLC, Hopkinton, MA (US)

(72) Inventors: Vladimir Shveidel, Pardes-Hana (IL); Lior Kamran, Rishon LeZion (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 191 days.

(21) Appl. No.: 16/050,075

(22) Filed: Jul. 31, 2018

(65) Prior Publication Data
US 2020/0042445 A1 Feb. 6, 2020

(51) Int. Cl.
*G06F 12/0815* (2016.01)
*G06F 11/07* (2006.01)
*G06F 12/0891* (2016.01)

(52) U.S. Cl.
CPC ...... *G06F 12/0815* (2013.01); *G06F 11/0709* (2013.01); *G06F 12/0891* (2013.01); *G06F 2212/1032* (2013.01); *G06F 2212/154* (2013.01)

(58) Field of Classification Search
CPC . G06F 12/08–0897; G06F 11/00–2097; G06F 2212/1032
See application file for complete search history.

(56) References Cited

U.S. PATENT DOCUMENTS 5,790,775 A   8/1998 Marks et al.
6,092,084 A *  7/2000 Clark ................. G06F 11/2023
8,838,850 B2  9/2014 Dommeti et al.
8,972,657 B1  3/2015 Armangau et al.
9,208,162 B1 12/2015 Hallak et al.
9,378,106 B1  6/2016 Ben-Moshe et al.
9,396,243 B1  7/2016 Halevi et al.
9,606,870 B1  3/2017 Meiri et al.
10,601,890 B2 * 3/2020 Douros ............... G06F 11/1438
2003/0101228 A1  5/2003 Busser et al.
2006/0220533 A1 10/2006 Achiwa et al.
2007/0050575 A1  3/2007 Uratani et al.

(Continued)

OTHER PUBLICATIONS

EMC Corporation, "Introduction to the EMC XtremIO Storage Array (Ver. 4.0);" White Paper; Apr. 2015; 65 Pages.

(Continued)

*Primary Examiner* — Nicholas J Simonetti
(74) *Attorney, Agent, or Firm* — Daly, Crowley Mofford & Durkee, LLP

(57) ABSTRACT

An aspect of cache recovery includes transmitting entries of a write cache (WC) journal ("entries") to all nodes and, for each node, recovering the entries, detecting entries with a logical address owned by the node, and performing a recovery operation. The operation includes for each entry, and upon determining the node owns the A2N slice: if the A2N slice has been continuously owned (CO) by the node, and the entry is not owned by the node, marking the entry as WC remote and entry updates are requested from a remote WC owner; if the A2N slice has not been CO by the node, and the entry is not owned by the node, maintaining the entry and continuing write flow operations, marking the entry as WC remote and all entry updates are requested from the remote WC owner and inserting the entry to a recovery list.

20 Claims, 10 Drawing Sheets

(56) References Cited

U.S. PATENT DOCUMENTS

| | | |
|---|---|---|
| 2009/0100441 A1* | 4/2009 | Wolman .............. G06F 9/5011 |
| | | 719/318 |
| 2011/0029730 A1 | 2/2011 | Durocher et al. |
| 2014/0185627 A1 | 7/2014 | Ditya |
| 2014/0258608 A1 | 9/2014 | Viswanatha |
| 2014/0351545 A1 | 11/2014 | Nakajima |
| 2016/0085460 A1 | 3/2016 | Chandrashekar |
| 2017/0242771 A1 | 8/2017 | Khemani et al. |

OTHER PUBLICATIONS

Swami, "XtremIO Hardware/Software Overview & Architecture Deepdive;" Retrieved from https://vjswami.com/2013/11/13/xtremio-hardwaresoftware-overview-architecture-deepdive/; Nov. 13, 2013; 18 Pages.
U.S. Non-Final Office Action dated May 15, 2019 for U.S. Appl. No. 16/050,400; 17 Pages.
Response to U.S. Non-Final Office Action dated May 15, 2019 for U.S. Appl. No. 16/050,400; Response filed Aug. 12, 2019; 11 Pages.
U.S. Appl. No. 16/050,400, filed Jul. 31, 2018, Alkalay, et al.
Amendment filed on Aug. 12, 2019 for U.S. Appl. No. 16/050,400; 11 pages.
Notice of Allowance dated Sep. 5, 2019 for U.S. Appl. No. 16/050,400; 8 Pages.

\* cited by examiner

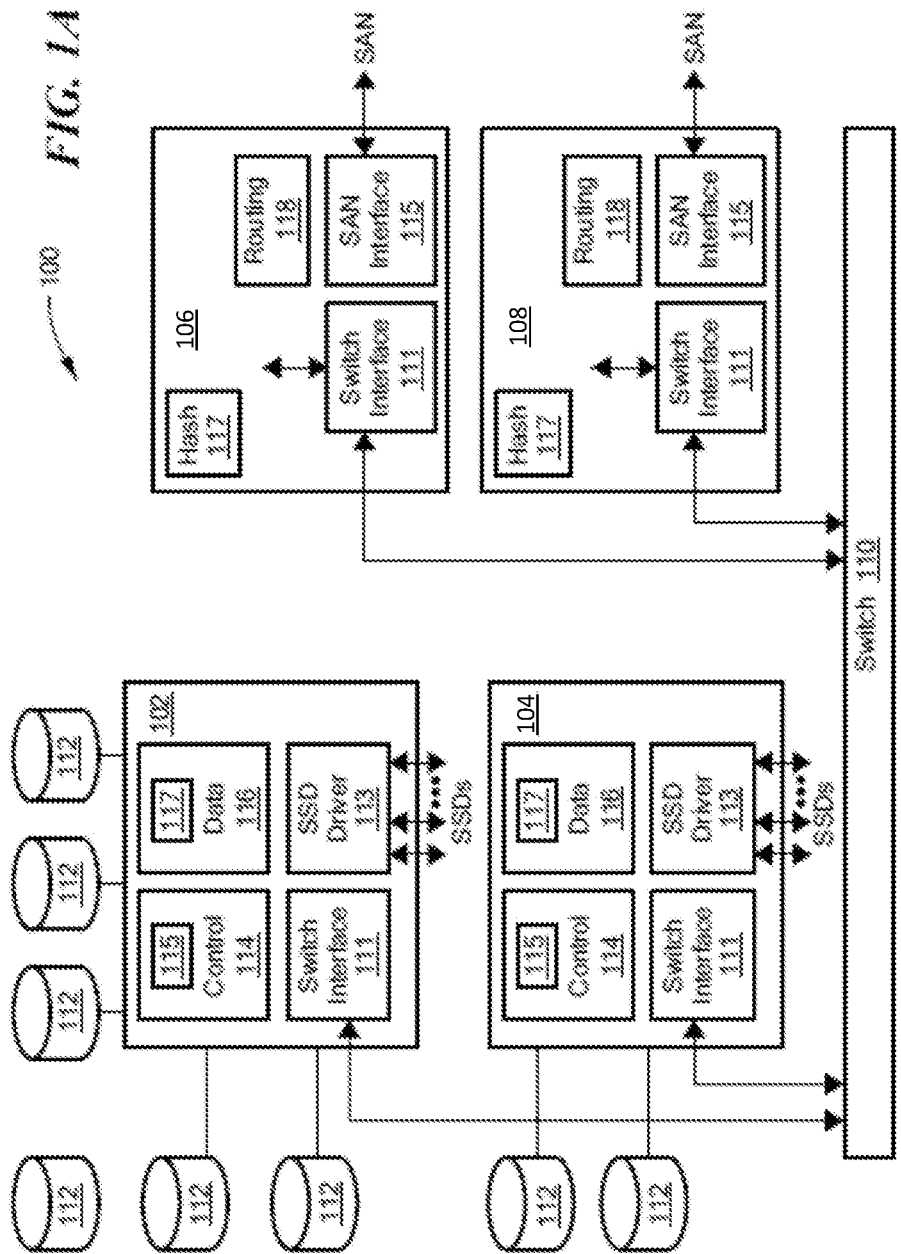

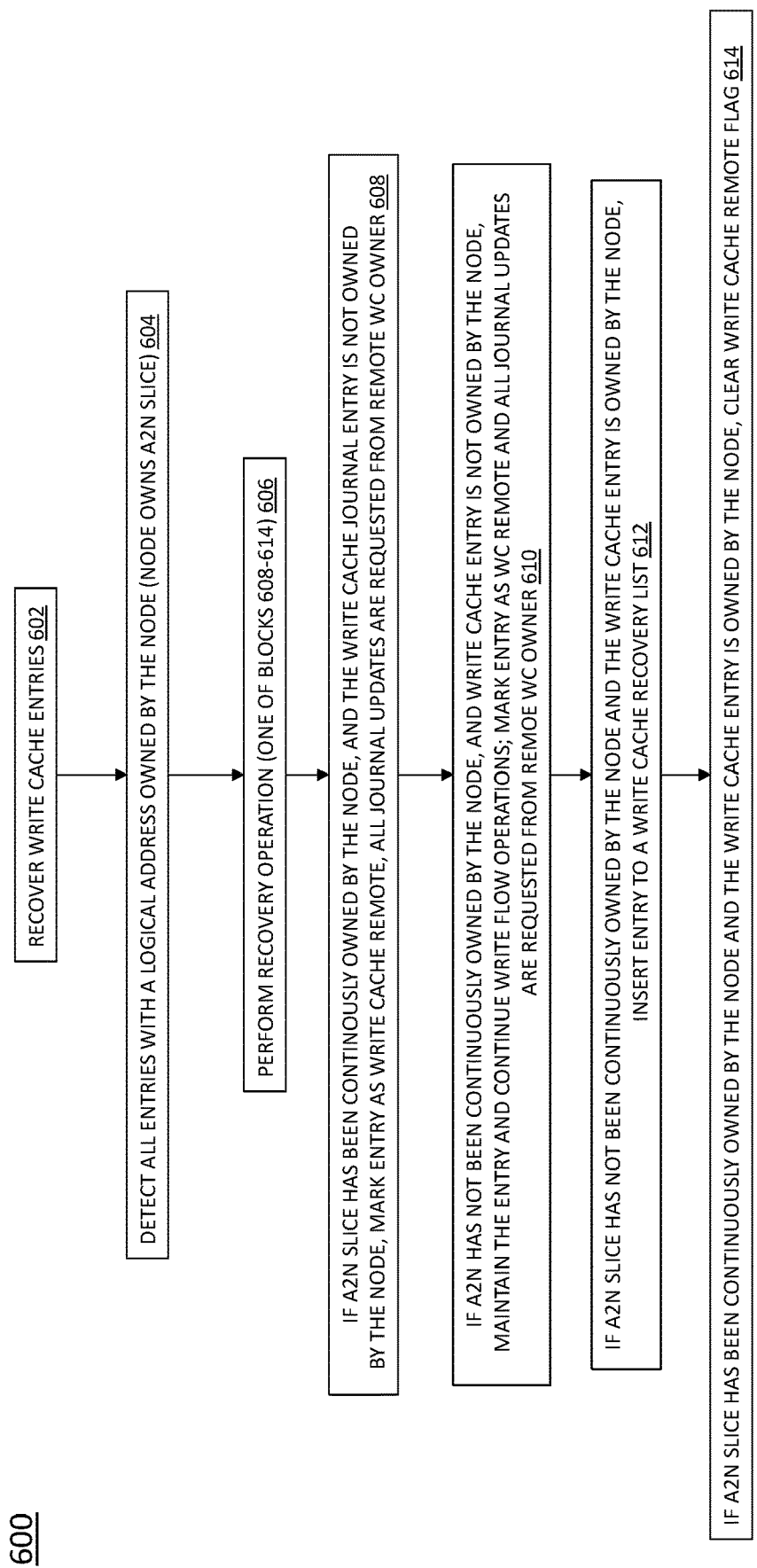

| 700A | | | | |
|---|---|---|---|---|
| Is A2H Slice owner? 702 | In CO? 704 | Is WC owner? 706 | Meaning 708 | Action 710 |
| No | No | No | Nor WC owner or address owner | Drop the entry |
| No | No | Yes | Only WC owner | Keep the entry for executing address owner requests |
| No | Yes | - | Impossible i.e. CO=TRUE means the Node is address owner | - |
| Yes | No | No | New responsibility for the entry as address owner only. | Keep the entry to continue write flow.<br>Mark the entry as "WC remote", so all journal updates would be requested from the remote WC owner Node. 724 |
| Yes | No | Yes | New responsibility for the entry as both ownerships. | Insert the entry to WcRecoveryList for further processing in the next stage. Insert entry into WcRecovery List for further processing in next stage 726 |
| Yes | Yes | No | The entry already exists prior the HA event, since it's CO, but journal update ownership was assigned to other Node. | Mark the entry as "WC remote" so all journal updates would be requested from the remote WC owner Node. 720 |
| Yes | Yes | Yes | The entry already exist prior the HA event. | Clear the "WC remote" flag if set. 728 |

FIG. 7A

| Points to WC? | Meaning | Action |
|---|---|---|
| No | The WC entry already started the asynchronous part of Write where the A2H is updated with the hash of the page (replacing the WC entry) | Mark the entry to continue write flow (after recovery is finished). |
| Yes | The WC entry Write flow hasn't reached the A2H update stage. | Mark the entry to start destage flow (after recovery is finished). Remove the entry from WcRecoveryList |

CACHE RECOVERY METHOD IN A DISTRIBUTED STORAGE SYSTEM

BACKGROUND

Storage systems provide content-based deduplicated data storage in which data block fingerprints may be generated from data content. As the costs of solid-state memory decrease, organizations can consider using systems that can store and process terabytes of data

SUMMARY

This Summary is provided to introduce a selection of concepts in a simplified form that are further described herein in the Detailed Description. This Summary is not intended to identify key features or essential features of the claimed subject matter, nor is it intended to be used to limit the scope of the claimed subject matter.

One aspect may provide a method for cache recovery in a distributed storage system. The method includes transmitting all entries of a write cache journal for each node to all the nodes and, for each node: recovering write cache journal entries and detecting all entries with a logical address owned by the node, and performing a recovery operation. The recovery operation includes for each write cache journal entry, and upon determining the node owns the A2N slice: if the A2N slice has been continuously owned by the node, and the write cache journal entry is not owned by the node, marking the entry as write cache remote and all write cache journal updates are requested from a remote WC owner; if the A2N slice has not been continuously owned by the node, and the write cache journal entry is not owned by the node, maintaining the entry and continuing write flow operations, marking the entry as WC remote and all journal updates are requested from the remote WC owner and inserting the entry to a write cache recovery list; if the A2N slice has not been continuously owned by the node, and the write cache journal entry is owned by the node, inserting the entry to the write cache recovery list; and if the A2N slice has been continuously owned by the node and the write cache entry is owned by the node, clearing a write cache remote flag in the write cache.

Another aspect may provide a system for cache recovery in a distributed storage system. The system includes a memory having computer-executable instructions and a processor. The processor executes the computer-executable instructions. When executed by the processor, the computer-executable instructions cause the processor to perform operations. The operations include transmitting all entries of a write cache journal for each node to all the nodes and, for each node: recovering write cache journal entries and detecting all entries with a logical address owned by the node, and performing a recovery operation. The recovery operation includes for each write cache journal entry, and upon determining the node owns the A2N slice: if the A2N slice has been continuously owned by the node, and the write cache journal entry is not owned by the node, marking the entry as write cache remote and all write cache journal updates are requested from a remote WC owner; if the A2N slice has not been continuously owned by the node, and the write cache journal entry is not owned by the node, maintaining the entry and continuing write flow operations, marking the entry as WC remote and all journal updates are requested from the remote WC owner and inserting the entry to a write cache recovery list; if the A2N slice has not been continuously owned by the node, and the write cache journal entry is owned by the node, inserting the entry to the write cache recovery list; and if the A2N slice has been continuously owned by the node and the write cache entry is owned by the node, clearing a write cache remote flag in the write cache.

Another aspect may provide a computer program product embodied on a non-transitory computer readable medium. The computer program product includes instructions that, when executed by a computer, causes the computer to perform operations. The operations include transmitting all entries of a write cache journal for each node to all the nodes and, for each node: recovering write cache journal entries and detecting all entries with a logical address owned by the node, and performing a recovery operation. The recovery operation includes for each write cache journal entry, and upon determining the node owns the A2N slice: if the A2N slice has been continuously owned by the node, and the write cache journal entry is not owned by the node, marking the entry as write cache remote and all write cache journal updates are requested from a remote WC owner; if the A2N slice has not been continuously owned by the node, and the write cache journal entry is not owned by the node, maintaining the entry and continuing write flow operations, marking the entry as WC remote and all journal updates are requested from the remote WC owner and inserting the entry to a write cache recovery list; if the A2N slice has not been continuously owned by the node, and the write cache journal entry is owned by the node, inserting the entry to the write cache recovery list; and if the A2N slice has been continuously owned by the node and the write cache entry is owned by the node, clearing a write cache remote flag in the write cache.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

FIG. 1A is a block diagram of a content-based storage system having multi-level cache for deduplicated storage;

FIG. 6 is a flow diagram of a process for implementing cache recovery in a distributed storage system;

FIGS. 7A-7B depict diagrams to facilitate the process of FIG. 7; and

DETAILED DESCRIPTION

Figure 1B:
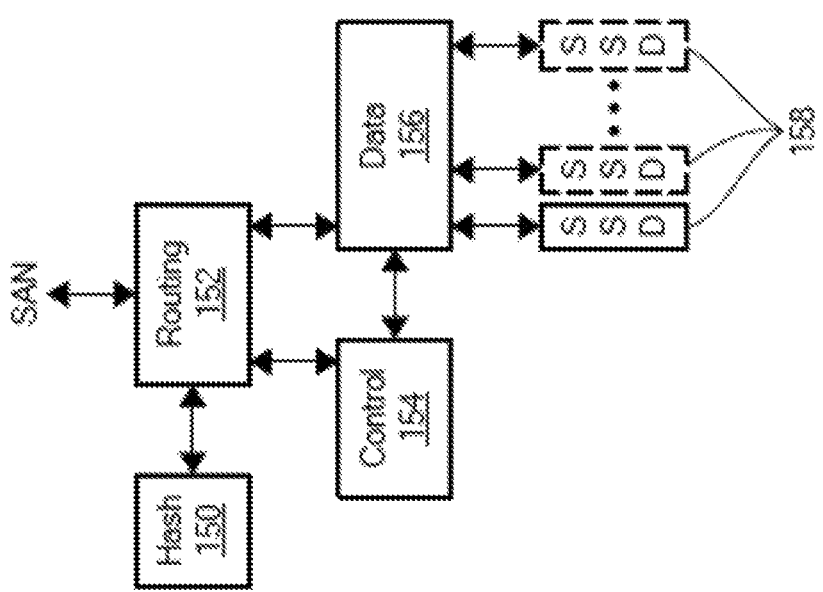
FIG. 1B illustrates further detail of the system of FIG. 1A.

Before describing embodiments of the concepts, structures, and techniques sought to be protected herein, some terms are explained. The following description includes a number of terms for which the definitions are generally known in the art. However, the following glossary definitions are provided to clarify the subsequent description and may be helpful in understanding the specification and claims.

As used herein, the term "storage system" is intended to be broadly construed so as to encompass, for example, private or public cloud computing systems for storing data as well as systems for storing data comprising virtual infrastructure and those not comprising virtual infrastructure. As used herein, the terms "client," "host," and "user" refer, interchangeably, to any person, system, or other entity that uses a storage system to read/write data. In some embodiments, the term "storage device" may also refer to a storage array including multiple storage devices. In certain embodiments, a storage medium may refer to one or more storage mediums such as a hard drive, a combination of hard drives, flash storage, combinations of flash storage, combinations of hard drives, flash, and other storage devices, and other types and combinations of computer readable storage mediums including those yet to be conceived. A storage medium may also refer both physical and logical storage mediums and may include multiple level of virtual to physical mappings and may be or include an image or disk image. A storage medium may be computer-readable, and may also be referred to herein as a computer-readable program medium.

In certain embodiments, the term "I/O request" or simply "I/O" may be used to refer to an input or output request, such as a data read or data write request.

In certain embodiments, a storage device may refer to any non-volatile memory (NVM) device, including hard disk drives (HDDs), solid state drivers (SSDs), flash devices (e.g., NAND flash devices), and similar devices that may be accessed locally and/or remotely (e.g., via a storage attached network (SAN) (also referred to herein as storage array network (SAN)).

In certain embodiments, a storage array (sometimes referred to as a disk array) may refer to a data storage system that is used for block-based, file-based or object storage, where storage arrays can include, for example, dedicated storage hardware that contains spinning hard disk drives (HDDs), solid-state disk drives, and/or all-flash drives (e.g., the XtremIO all flash drive, available from DELL/EMC of Hopkinton Mass.). In certain embodiments, a data storage entity may be any one or more of a file system, object storage, a virtualized device, a logical unit, a logical unit number, a logical volume, a logical device, a physical device, and/or a storage medium.

In certain embodiments, a logical unit (LU) may be a logical entity provided by a storage system for accessing data from the storage system, and as used herein a logical unit is used interchangeably with a logical volume. In many embodiments herein, a LU or LUN (logical unit number) may be used interchangeable for each other. In certain embodiments, a LUN may be a logical unit number for identifying a logical unit; may also refer to one or more virtual disks or virtual LUNs, which may correspond to one or more Virtual Machines.

In certain embodiments, a physical storage unit may be a physical entity, such as a disk or an array of disks, for storing data in storage locations that can be accessed by address, where physical storage unit is used interchangeably with physical volume. In certain embodiments, a data storage entity may be any one or more of a file system, object storage, a virtualized device, a logical unit, a logical unit number, a logical volume, a logical device, a physical device, and/or a storage medium.

In certain embodiments, a snapshot may refer to differential representations of an image, i.e. the snapshot may have pointers to the original volume, and may point to log volumes for changed locations. In certain embodiments, a snapshot may refer to differential representations of the state of a system. Snapshots may be combined into a snapshot array, which may represent different images over a time period or different states of a system over a time period.

In certain embodiments, a journal may be a record of write transactions (e.g., I/O data) issued to a storage system, which may be used to maintain a duplicate storage system, and to roll back the duplicate storage system to a previous point in time. In some embodiments, each entry in a journal contains, apart from the I/O data itself, I/O metadata that can include information such as a volume identifier (ID), the I/O block offset within the volume, the I/O length, and a time stamp of the I/O.

In certain embodiments, XtremIO, available from Dell EMC of Hopkinton, Mass.) is a type of content addressable storage array that uses all flash technology. Flash, as is understood, is a solid-state (SS) random access media type that can read any address range with no latency penalty, in comparison to a hard disk drive (HDD) which has physical moving components which require relocation when reading from different address ranges and thus significantly increasing the latency for random I/O data.

In certain embodiments, a data protection strategy that can be advantageous for use with computer systems, especially networked storage systems, is checkpointing. A checkpoint, as used herein, contains a consistent point in time image of an entire system, including configuration, logical volume mapping metadata, physical on disk layout metadata, and actual user data. In certain embodiments, a checkpoint preserves the state of a system at a given point in time by saving one or more snapshots of, for example, a file system, or an application at one or more points in time. A checkpoint can preserve a snapshot of an application's state, so that it can restart from that point in case of failure, which can be useful for long running applications that are executed in failure-prone computing systems. If a checkpoint is used, an application periodically writes large volumes of snapshot data to persistent storage in an attempt to capture its current state. Thus, if there is a failure, the application can recover by rolling-back its execution state to a previously saved checkpoint.

In certain embodiments, a "checkpoint" refers at least to an entity created by a checkpoint process, where the checkpoint process performs actions to preserve the state of an apparatus, system, or other entity (including software entities) at a particular time. Advantageously, a checkpoint includes information such as user data, the configuration of the apparatus, user metadata, and other information related to the internal state of the apparatus or system. For example, some storage systems (including XtremIO), in accordance with certain embodiments herein, also provide some kind of checkpoint feature, to provide an ability to preserve system state including user data and metadata at some defined point in time in order to restore this state after system malfunction or corruption. In certain embodiments, the checkpoint corresponds to a frozen, immutable re representation of the state of a system or apparatus at certain point in time, including user data, metadata, and the system configuration. In certain embodiments, the checkpoint is stored in a dedicated, reserved location within the system. In certain embodiments, the checkpoint is able to be created in an online, dynamic environment, where the checkpoint creation is transparent to entities having I/O interactions with the system.

For a file system, the accuracy and consistency of a file system is necessary to relate applications and data, so a checkpoint provides a way to provide periodic backup of file server state to allow system recovery in the event of faults or failures. When data corruption is detected, one of the checkpoints can be used for file system recovery. Similarly, a checkpoint, in a virtualization context, is a snapshot of the state of a virtual machine. Like a restore point in MICROSOFT WINDOWS operating systems, a checkpoint allows an administrator to restore an entity (e.g., a computer system, a file system, an application, a virtual machine, etc.) to a previous state. Checkpoints also can be used to create backups before conducting updates. Should an update fail or cause problems, an administrator can return the virtual machine to its state prior to the update. A recover action is used to return the system to the checkpoint state.

In some embodiments, logical block addressing" (LBA) refers to a linear addressing technique for specifying locations of blocks of data stored in storage system.

In certain embodiments, a RAID stripe is a group of pages that are RAID self-consistent (data in a RAID stripe can be recovered upon drive failure, independently of data residing on other RAID stripes), and that RAID operation is performed atomically on this space. A RAID stripe has stripe metadata (MD) associated with it describing it's type (usually the block size it supports).

In some embodiments, a demoted LBA/hash refers to a LBA or hash that is not in memory (e.g., RAM), and thus requires SSD read operations to load the metadata).

In some embodiments, non-volatile memory over fabrics (NVMEoF) refers to a specification to enable non-volatile memory message-based commands to transfer data between hosts and targets (solid-state storage) or other systems and networks, such as Ethernet, Fibre Channel (FC) or Infiniband.

While vendor-specific terminology may be used herein to facilitate understanding, it is understood that the concepts, techniques, and structures sought to be protected herein are not limited to use with any specific commercial products. In addition, to ensure clarity in the disclosure, well-understood methods, procedures, circuits, components, and products are not described in detail herein.

The phrases, "such as," "for example," "e.g.," "exemplary," and variants thereof, are used herein to describe non-limiting embodiments and are used herein to mean "serving as an example, instance, or illustration." Any embodiments herein described via these phrases and/or variants is not necessarily to be construed as preferred or advantageous over other embodiments and/or to exclude the incorporation of features from other embodiments. In addition, the word "optionally" is used herein to mean that a feature or process, etc., is provided in some embodiments and not provided in other embodiments." Any particular embodiment of the invention may include a plurality of "optional" features unless such features conflict.

FIG. 1A shows an illustrative content-based data storage system 100 with deduplication that may have multi-level data caches in accordance with embodiments of the disclosure. In the illustrated embodiment, first, second, third, and fourth nodes 102, 104, 106, 108 can be interconnected by a switch 110 via a switch interface 111. The first node 102 can include a control system 114 and a data system 116. In embodiments, separate data and control planes may be provided by the control and data systems 114, 116. The control system 114 may control execution of read and write commands to the storage devices 112. The data systems 116 may be connected to the storage devices 112 and, under control of a respective control system 114, may pass data to and/or from the storage devices via suitable storage drivers 113.

The data and/or control systems 114, 116 may retain extracts of the data stored in the storage devices 112. In embodiments, the data extracts may be generated by cryptographic hashing of the data content in the data blocks. In embodiments, the extracts may be used for content addressing of the data blocks to the physical storage devices 112.

The second node 104 can include a hash system 117 to generate the hash/extract, which can be referred to as a content fingerprint for the data blocks. The second node 104 can also include a routing system 118, along with a switch interface 111 and a SAN interface 115. The routing system 118 may terminate storage and retrieval operations and distribute commands to control systems 114 that may be selected for the operation in such a way as to retain balanced usage within the system. In the illustrated embodiment, the third node 106 can be similar to the first node 102 and the fourth node 108 can be similar to the second node 108.

The routing systems 118 may use the hash values calculated from data blocks to select control systems 114 for distribution. More particularly, selection of the control system 114 may use hash values, or may rely on the user address and not on the content (hash). The hash value may, however, be used for selecting the data system 116, and for setting the physical location for data storage within the data system.

In example embodiments, control modules 114 (also referred to as "C-Modules") can include a C cache 115 and the data modules 116 (also referred to as "D-Modules") can include a D cache 117. As explained more fully below, the C cache 115 can include addresses, address hashes, and physical data location information and the D cache 117 can include, for each bucket, a filter, a hash to address, and bucket information. The control modules may be referred to as a logical layer, holds the metadata for the logical layer, and implements the volume/snapshot operations. The data module manages the SSDs and implements one or more RAID algorithms as described further herein.

In some examples, the system 100 may employ more than a single type of memory technology, including a mix of more than one Flash technology (e.g., single level cell (SLC) flash and multilevel cell (MLC) flash), and a mix of Flash and DRAM technologies. In certain embodiments, data mapping may optimize performance and life span by taking advantage of the different access speeds and different write/erase cycle limitations of the various memory technologies.

FIG. 1B is an example of a system that can include a hash system 150 communicatively coupled to a routing system 152, which can be communicatively coupled to a control system 154 and a data system 156. The data system 156 can be communicatively coupled to any practical number of memory devices 158. The routing system 152 can route read/write commands from a host (not shown) to control and data systems 154, 156 for execution. In embodiments, the data content-based mapping to physical storage 158 can distribute workload relatively evenly and provide separation of the control and data paths. Read and write operations to the SSDs 158 can be used to generate priority values for the data blocks, as described more fully below.

Figure 2:
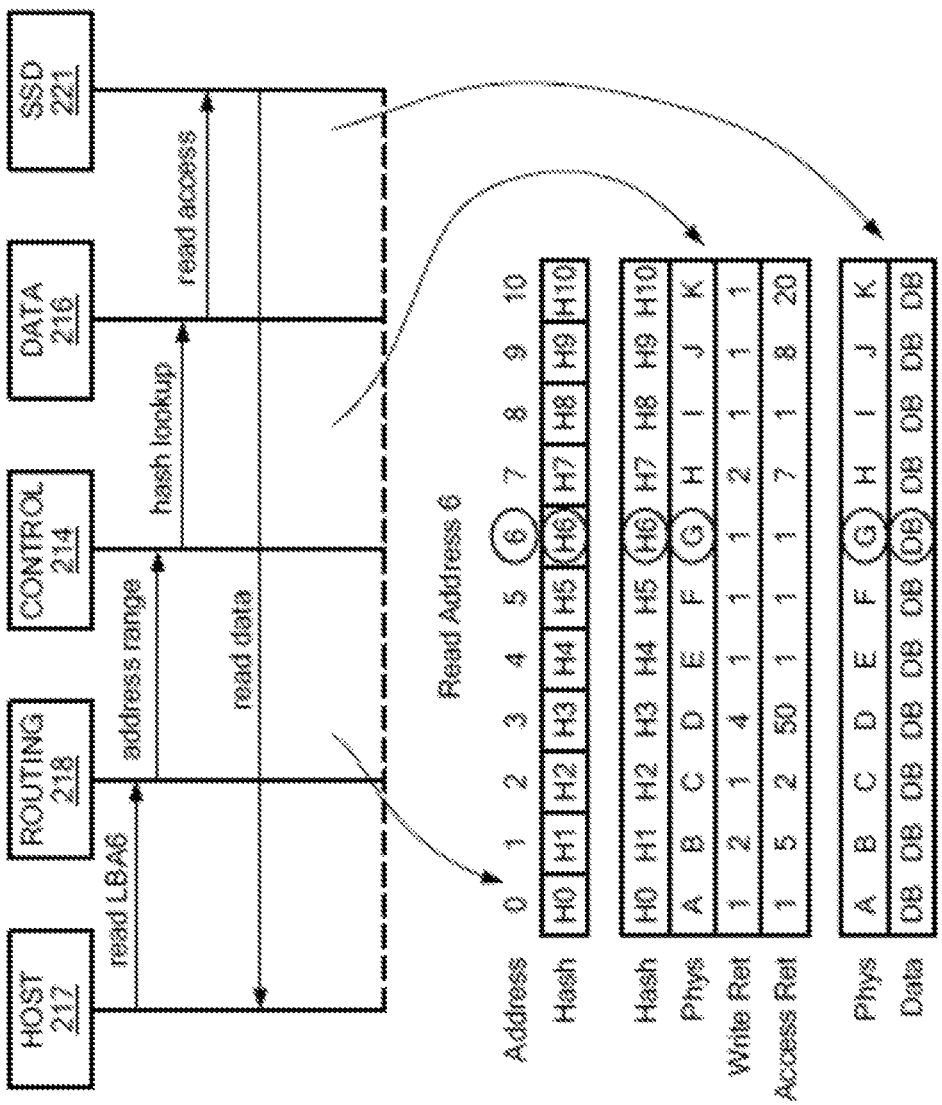
FIG. 2 is a flow diagram of read and write operations for the system of FIG. 1A.

FIG. 2 shows an example IO operation. A host 217 may issue a read command for a logical block address, which is shown as address "6," via a Fibre Channel or iSCSI port, for example. The routing system 218 may receive the read command and determine a requested address range in data blocks of 4K, for example, and pass the address information to the control system 214. The control system 214 may look up address 6 to obtain the hash value, which is shown as H6. This may be referred to as address-to-hash (A2H) lookup. The H6 hash value may be passed to the data system 216 which can perform a look up of the H6 hash value in a hash-to-physical address (H2P) table to read the physical address for the data. In the example, the physical address is shown as "G." The data system 216 can use the physical address to read the data block (DB) at physical address G in the SSD 221. A reference count can correspond to a number of times the hash value is referenced in physical storage. In embodiments, write reference information can be modified for each unique and/or deduplicated write and access reference information can be modified for each read and/or write access.

For a write operation from a host, the routing system 218 can receive the write data and can segment the data stream into data blocks and generate hash values for the data blocks. The hash value can be provided to the control system 214 to determine if the write data is unique. If unique, the hash value can be placed in an address mapping. The control system 214 can pass the hash value to the data system 216, which can assign the hash value to a physical address and write the data block(s) to the SSD at the physical address. In embodiments, the write reference information and/or the access reference information, can be modified, e.g., incremented.

If the hash value generated by the routing system 218 is not unique, the control system 214 can determine that data already exists at the physical address for the hash value. Since the data already exists, the data system 216 can increment the write reference information for the data block. In embodiments, the access reference information can also be modified. The data may not be written to the SSD. Deduplication may refer to a write operation where a hash for a data block is found not be unique and the non-unique data block is not written to physical storage. The reference count for the non-unique hash may be incremented.

Figure 3:
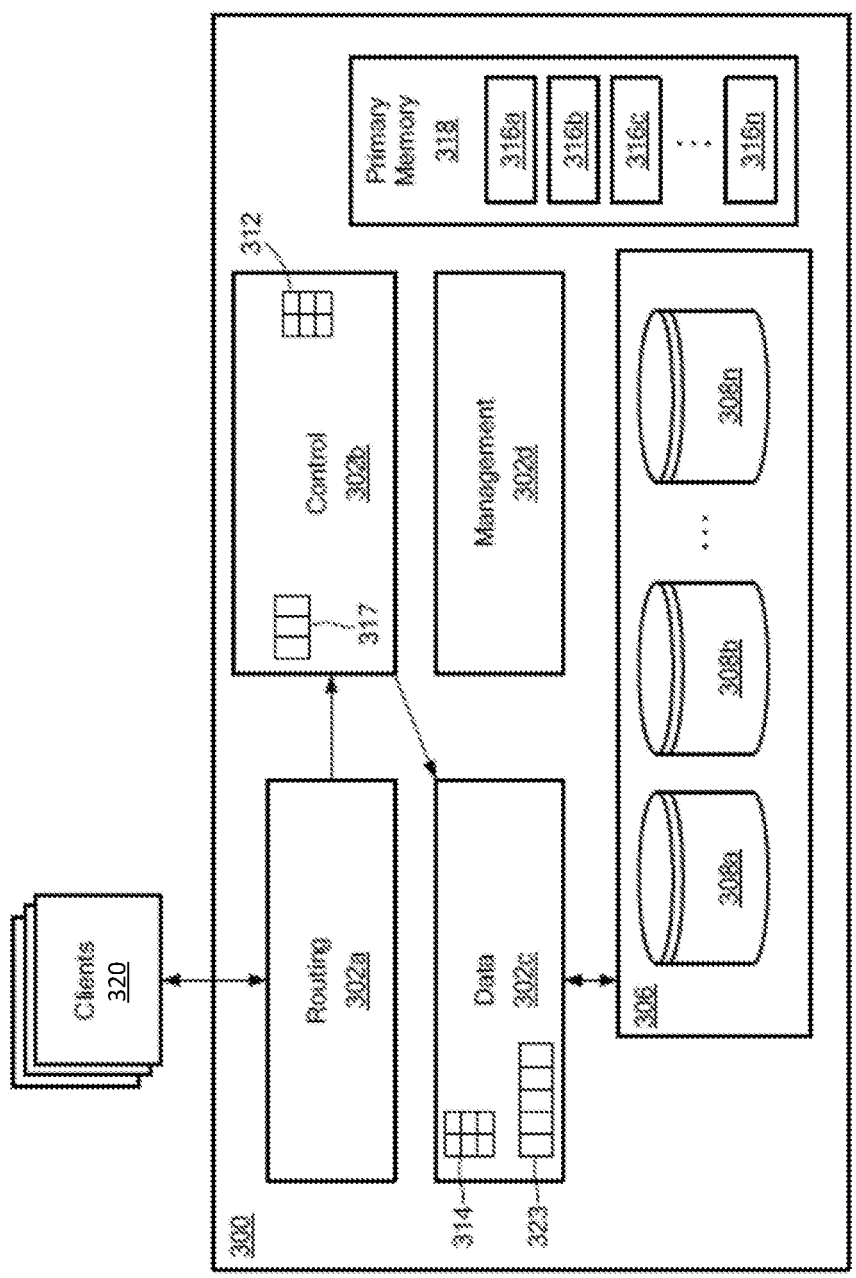
FIG. 3 is a block diagram of a content-based storage system having a control module with a first cache and a data module with a second cache.

FIG. 3 shows a storage system 300 according to an illustrative embodiment of the disclosure. The storage system 300 may be the same as or similar to a node within the distributed storage system of FIG. 1A. The storage system 300 may include a plurality of modules 302a-302d (generally denoted 302 herein), a storage array 306 comprising a plurality of storage devices 308a . . . 308n (generally denoted 308 herein), and a primary memory 318. In some embodiments, the storage devices 308 may be provided as solid-state devices (SSDs).

As described further herein, the storage system 300 also can include a C (also called logical) cache 317 and a D (also called physical) cache 323. The C cache 317 and/or the D cache 323 can, in certain embodiments, be physical devices configured to store certain data so that future requests for that data can be served faster. Although the C cache 317 and D cache 323 are shown as being part of the storage system, it is understood that the C cache 317 and/or D cache 323 can be located anywhere such that they are accessible quickly to the storage system. Data that is stored within a cache might include data values that have been computed earlier or duplicates of original values that are stored elsewhere. If the requested data is contained in the cache (herein referred to as a cache hit), this request can be served by simply reading the cache, which is comparatively faster than going to other types of memory. On the other hand, if the requested data is not contained in the cache (herein referred to as a cache miss), the data may have to be to be recomputed or fetched from its original storage location, which is comparatively slower. Hence, the greater the number of requests that can be served from the cache, the faster the overall system performance becomes.

The primary memory 318 can be any type of memory having access times that are faster compared to the storage devices 308. In some embodiments, primary memory 318 may be provided as dynamic random-access memory (DRAM). In certain embodiments, primary memory 318 may be provided as synchronous DRAM (SDRAM). In one embodiment, primary memory 318 may be provided as double data rate SDRAM (DDR SDRAM), such as DDR3 SDRAM.

As described above, the control subsystem 302b may be configured to maintain a mapping between I/O addresses associated with data and the corresponding chunk hashes. As shown in FIG. 3, this mapping may be maintained using a data structure 312, referred to herein as an "I/O address to chunk hash mapping table" or "A2H table," (also known as A→H table) according to some embodiments. In one embodiment, I/O addresses may be logical addresses used by clients 320 to access data within the storage system 300.

As also described above, the data subsystem 302c may be configured to maintain a mapping between chunk hashes and physical storage addresses (i.e., storage locations within the storage array 306 and/or within individual storage devices 308). This mapping may be maintained using a data structure 314, referred to herein as a "hash to physical address mapping table" or "H2P table," or "H→P table," according to some embodiments, where this table, in certain embodiments, includes information similar to that of the aforementioned HMD (hash metadata) and PL (physical layout) tables. In certain embodiments, as described, for example, in the incorporated by reference patents, there also may be a mapping referred to as the H2D or H→D table, where D stands for disk physical layout. In certain embodiments, the H2P table is maintained to route data with different hashes to different D modules. The data subsystem 302c may be also be configured to read and write data from/to the storage array 306 (and/or to individual storage devices 308 therein).

As described above, in a content addressable storage system, data is stored in blocks, for example 16 KB, 8 KB, 4 KB, etc., where each block has a universally unique large hash signature, for example of 20 bytes, which can be saved to disk, e.g., Flash memory. As described herein, hash signatures may be accessed by small in-memory handles (referred to herein as short hash handles, hash handles, or short hashes), for example of 6 bytes. These short hashes may be unique to each volume/array, but not necessarily unique across volumes/arrays. Additional information relating to hash-based replication, computation of hashes, generation and use of short hash handles can be found in U.S. Pat. No. 9,378,106 ("Hash Based Replication"); U.S. Pat. No. 9,208,162 ("Generating a Short Hash Handle") and U.S.

Pat. No. 9,396,243 ("Hash-Based Replication Using Short Hash Handle and Identity Bit"), each of which is hereby incorporated by reference.

In embodiments, address to hash mapping (A2H) maps an address inside a volume to the short hash value of its data. In embodiments, meta data can include for each address the hash value of the content. If the basis for deduplication is 16 KB, then the meta data holds for each address the short hash value of the data to which the address points. In cases where access to the volume is in larger chunks than the size of the basic hash value, the meta data for the address space can be readily cached.

As also noted above, hash to physical disk locations can include for each hash key (e.g., 6 bytes) the location on the disk, and the reference count. Where a storage system uses hash keys of 6 bytes, there may be collisions of data generating the same hash. If there is a collision, a new hash key from a different hash address space is generated for the data when the data is written. This means that the hash to physical disk location table may search for a hash value every time a new write arrives. If the write has the same hash value, there is a need to check the long hash value, and verify if there is a hash collision, or whether it is actually the same data. This means that during every write if the hash to physical disk location table is not in the system memory, there may a need to fetch the meta data of the hash from the disk to verify if such a hash exists. It will be appreciated that meta data structures may consume most of system memory, e.g., DRAM, in the storage system, so that the meta data limits the total size of the storage system.

Figure 4:
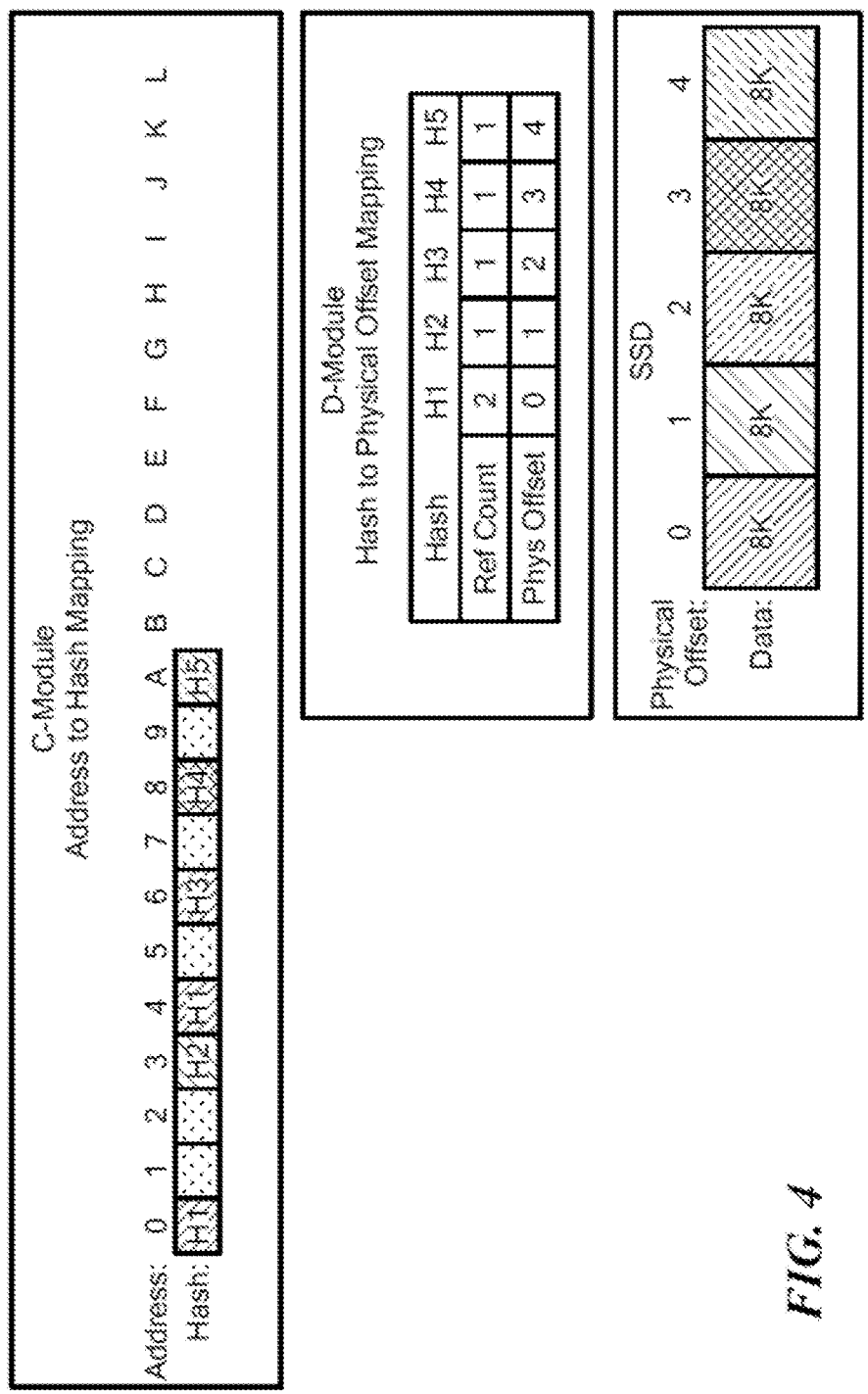
FIG. 4 is a schematic representation of address-to-hash (A2H) mapping in a control module and hash-to-physical (H2P) mapping in a data module for a content-based storage system.

FIG. 4 shows an example control or C module address to hash (A2H) mapping 400. As can be seen, as data blocks arrive, the content for the address is hashed to generate H1, H2, H3, H4, H5, as shown. It should be noted that H1 appears twice and is deduplicated. The D-module includes a hash to physical (H2P) mapping showing the physical offset of the data along with a reference count indicative of how many times a given hash value occurs. It will be appreciated that a particular hash value having a high reference count will likely be accessed more often than hash values having a low reference count. In embodiments, a reference count is incremented each time the hash value is generated in a volume. Thus, higher reference count hash values may be preferred for placement in D cache over low reference count hash values. It can be seen that the physical offset corresponds to the order in which a unique hash value is generated. For example, H3 is shown with an offset value of 2 since a second H1 value was deduplicated.

Figure 5:
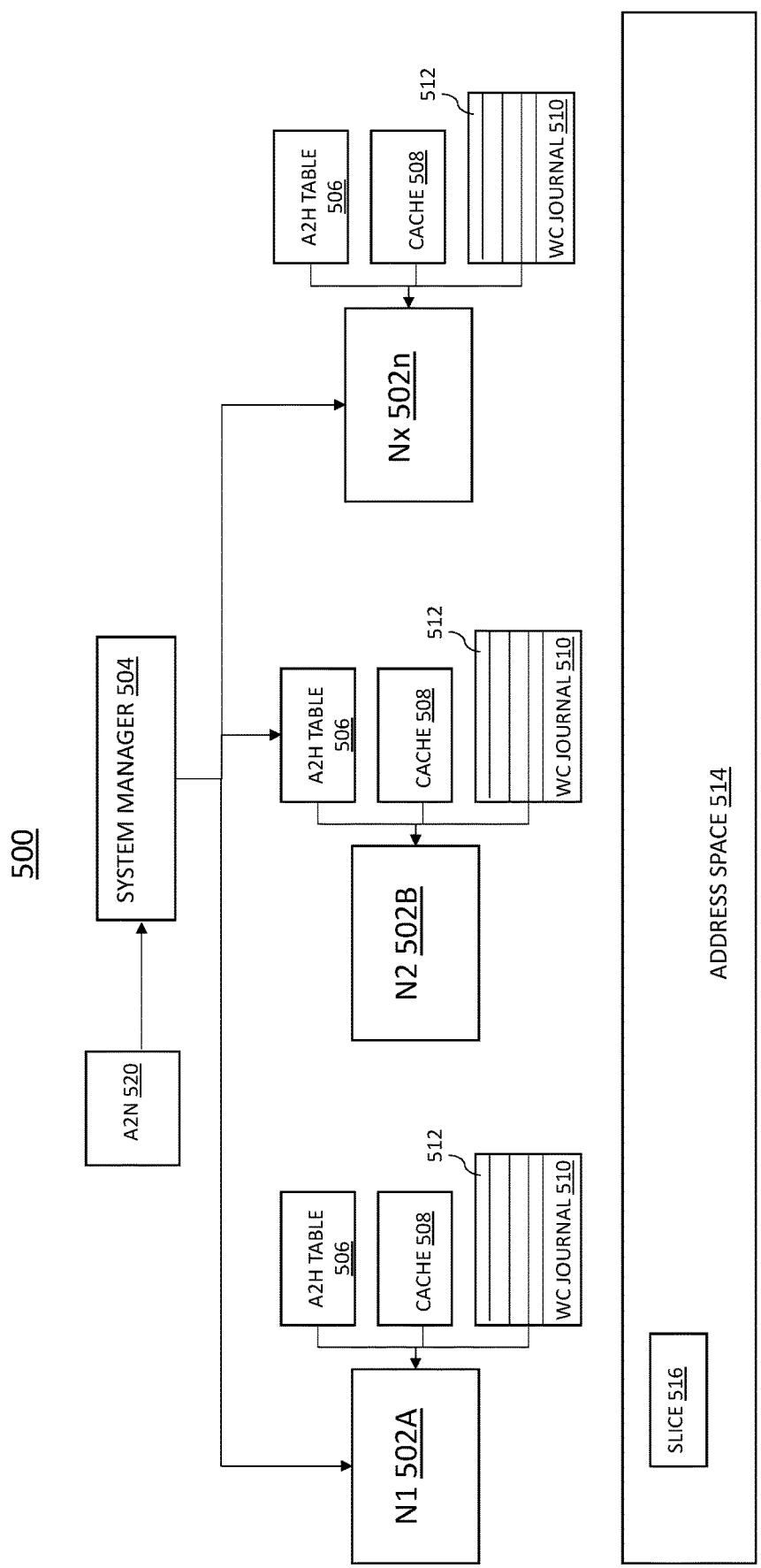
FIG. 5 is a block diagram cache recovery in a distributed storage system.

Turning now to FIG. 5, a system 500 upon which cache recovery in a distributed storage system environment will now be described. In the distributed storage system 500, there are multiple nodes 502A-502N that are connected in a full-mesh network and managed by a system manager 504, each node may include an A2H table 506, a write cache 508, and a write cache journal 510. The A2H table 506 is responsible for mapping logical addresses to a hash value of the page associated with the addresses. The write cache 508 is a component aimed to reduce IO write latency by shortening the synchronous 10 handling part. The write cache journal 510 is responsible for the persistence of the write cache entries 512, both data and metadata.

The system 500 supports failure of nodes, the return of failed nodes back to the system, and the addition of new nodes. These events may be referred to as high availability (HA) events. HA events naturally cause the redistribution of responsibilities between the nodes, as will be described further herein.

Address space 514 is divided into slices 516 that are distributed across the nodes for load balancing. Each node is responsible for IOs directed to the address space it owns. The system manager maintains an address-to-node (A2N) table that maps addresses to nodes.

On any HA event, the system manager 504 redistributes A2N slices 516 between the currently alive (e.g., configured and having responsibility for addresses, etc.) nodes.

To support HA events, the number of A2N slices 516 should be large enough so that it's possible to distribute them evenly to all nodes. The set of A2N slices that any node owns may change on any HA event.

Each node owns the write cache (WC) journal 512 which is composed of WC entries 512 storing the written data and the metadata associated with an IO 518. A WC journal entry 512 can be allocated for any of the write IOs the node is handling. The WC entry holds the logical address of the write IO request. Contrary to the A2N slices, the whole WC journal of a failed node is assigned to another node (i.e., it is not divided between multiple nodes). Similarly, when a failed node is returned to the system, the same WC journal it owned before the failure is assigned to this node again.

The write flow is split into two parts: synchronous and asynchronous. In the synchronous portion, the data is stored in the WC journal, the IO is acknowledged, and the A2H table is updated to point to the WC entry. In the asynchronous portion of the flow, the data is fully written to disk. This part is further split into several stages so that the A2H is updated to point to the hash value of the written data before the data is written to disk.

The WC entry has a state that is transitioned according to the write flow stages.

Each allocated WC entry has two ownerships: an address owner, which is the node that owns the A2N slice for which the WC entry was allocated; and a WC owner, which is the node that owns the WC journal for which the WC entry was allocated.

It follows that at first, the two ownerships are in the same node, but after the HA event they may be in different nodes. An HA event affects all nodes in the system and creates complex dependencies between the two ownerships.

To address this challenge, the embodiments described herein provide a recovery technique that handles these dependencies, recovers the write cache entries' states, and allows the continuation of the write process from the stage prior to the HA event.

The address owner, as the owner of the corresponding A2H entry, is responsible for the whole WC entry operation until fully completed and the entry is free (i.e., regardless of the identity of the WC owner of the WC entry).

A node that is only the WC owner (and not the address owner) of an entry is a slave to requests from the address owner node. Its responsibility is to update and free the journal entry on request from the address owner.

For WC journal recovery, all WC journal ownerships are sent to all nodes, so each node receives all WC entries in the system.

For A2H recovery, all nodes are updated with the updated A2N table 520 (e.g., that changed in the HA event). Only A2H journal entries that belong to A2N slices that changed ownership are sent to the new owner node for recovery.

In embodiments, the term ContinuouslyOwned (CO) is a property-to-node+A2N slice such that: CO(Node, A2N slice) is TRUE when the node owned the A2N slice before and after the HA event.

The recovery flow includes three stages, which are performed by each node in the system. Turning now to FIGS.

6, 7A and 7B, the cache recovery operations will now be described for a first stage of the embodiments. FIG. 6 illustrates a flow diagram of a process 600 for implementing a portion of the cache recovery operations, and FIGS. 7A-7B, charts 700A and 700B illustrate ownerships and corresponding actions in relation to the process 600 of FIG. 6.

In the first stage, the WC recovery, the process 600 recovers WC entries in block 602 and detects all WC entries with logical addresses owned by this node (i.e., the corresponding A2N slice is owned by this node) in block 604. In block 606, recovery operations are performed, which are itemized in blocks 608-614, and illustrated in the diagram 700A of FIG. 7A. Thus, block 608 corresponds to row 720, block 610 corresponds to row 724, block 612 corresponds to row 726, and block 614 corresponds to row 728.

As shown in FIG. 7A, in the first stage of the process, there are three determinations (columns 702, 704, and 706) that affect the resulting outcome or action (column 710). In column 708, the determination/event is described.

In the second stage of the process, A2H recovery for slices the node owned due to the HA event (i.e., not the CO slices) is shown in FIG. 7B. In the second stage, the process recovers A2H entries and detects addresses that point to WC entries. In FIG. 7B, the determinations are shown in column 730 and the resulting actions of those determinations are shown in column 732. Column 734 describes the determination/event.

In the third stage, the process reviews the WC entries that are still in the WcRecoveryList. These entries have no A2H references, which means they already begin the asynchronous process where the A2H table is updated with the hash value of the page (replacing the WC entry). The write flow continues according to the WC entry state. The WcRecovery list is in volatile memory (RAM) and is used during recovery operations. At the start of the recovery, the list is empty. During a first stage of recovery, entries are added. During second and third stages of the recovery, entries are removed from the list. At the end of the recovery this list will be empty. This feature is shown, e.g., in FIG. 7A.

This list is used in the third stage to get the remaining recovered WC entries that were not handled in the second stage.

Figure 8:
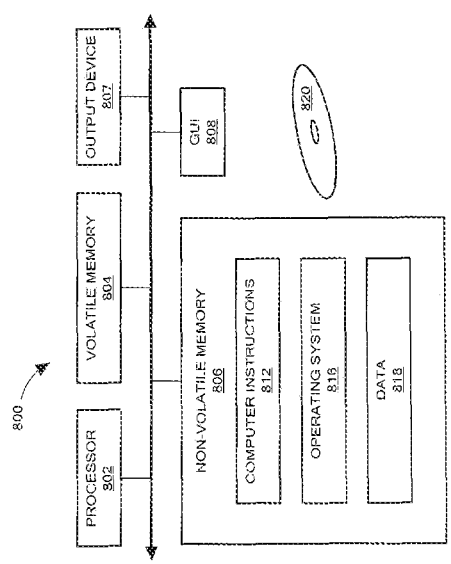
FIG. 8 is a block diagram of an illustrative computer that can perform at least a portion of the processing described herein.

FIG. 8 shows an exemplary computer 800 (e.g., physical or virtual) that can perform at least part of the processing described herein. The computer 800 includes a processor 802, a volatile memory 804, a non-volatile memory 806 (e.g., hard disk or flash), an output device 807 and a graphical user interface (GUI) 808 (e.g., a mouse, a keyboard, a display, for example). The non-volatile memory 806 stores computer instructions 812, an operating system 816 and data 818. In one example, the computer instructions 812 are executed by the processor 802 out of volatile memory 804. In one embodiment, an article 820 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A method for cache recovery in a distributed storage system environment in response to a high availability (HA) event and redistribution of address-to-node (A2N) slices between currently alive nodes, the method comprising:
transmitting all entries of a write cache journal for each node to all the nodes; and
for each node:
recovering write cache journal entries and detecting all entries with a logical address owned by the node; and
performing a recovery operation, comprising:
for each write cache journal entry, and upon determining the node owns the A2N slice:
if the A2N slice has been continuously owned by the node, and the write cache journal entry is not owned by the node, marking the entry as write cache remote and all write cache journal updates are requested from a remote WC owner;
if the A2N slice has not been continuously owned by the node, and the write cache journal entry is not owned by the node, maintaining the entry and continuing write flow operations, marking the entry as WC remote and all journal updates are requested from the remote WC owner and inserting the entry to a write cache recovery list;

if the A2N slice has not been continuously owned by the node, and the write cache journal entry is owned by the node, inserting the entry to the write cache recovery list; and if the A2N slice has been continuously owned by the node and the write cache entry is owned by the node, clearing a write cache remote flag in the write cache.

2. The method of claim 1, wherein continuously owned indicates address ownership by a single node before and after the HA.

3. The method of claim 1, wherein:

continuously owned address ownership of the A2N slice where the write cache journal entry is not owned by the node indicates the entry exists prior to the HA event but journal update ownership is not assigned to the node; and non-continuous ownership of the A2N slice wherein the write cache journal entry is not owned by the node indicates the address owner has sole responsibility of the entry.

4. The method of claim 1, wherein:

non-continuous ownership of the A2N slice where the write cache journal entry is owned by the node indicates both the A2H owner and the WC owner are responsible for the entry; and continuous ownership of the A2N slice wherein the write cache journal entry is owned by the node indicates the entry existed prior to the HA event.

5. The method of claim 1, further comprising:

recovering A2H entries of an A2H table for each node;

detecting addresses that point to a write cache journal entry;

marking the write cache journal entry to begin destage flow upon completion of recovery; and removing the write cache journal entry from the write cache recovery list.

6. The method of claim 5, further comprising:

upon detecting no address points to the write cache journal entry, continuing write flow operations upon completion of recovery.

7. The method of claim 1, further comprising:

accessing write cache entries in the write cache recovery list indicating entries have no A2H reference; and continuing write flow operations according to write cache entry state;

wherein entries having no A2H reference indicate entries in process of asynchronization where A2H is updated with a hash value of a page corresponding to address.

8. A system for cache recovery in a distributed storage system environment in response to a high availability (HA) event and redistribution of address-to-node (A2N) slices between currently alive nodes, the system comprising:

a memory comprising computer-executable instructions; and a processor executing the computer-executable instructions, the computer-executable instructions when executed by the processor cause the processor to perform operations comprising:

transmitting all entries of a write cache journal for each node to all the nodes; and for each node:

recovering write cache journal entries and detecting all entries with a logical address owned by the node; and performing a recovery operation, comprising:

for each write cache journal entry, and upon determining the node owns the A2N slice:

if the A2N slice has been continuously owned by the node, and the write cache journal entry is not owned by the node, marking the entry as write cache remote and all write cache journal updates are requested from a remote WC owner;

if the A2N slice has not been continuously owned by the node, and the write cache journal entry is not owned by the node, maintaining the entry and continuing write flow operations, marking the entry as WC remote and all journal updates are requested from the remote WC owner and inserting the entry to a write cache recovery list;

if the A2N slice has not been continuously owned by the node, and the write cache journal entry is owned by the node, inserting the entry to the write cache recovery list; and if the A2N slice has been continuously owned by the node and the write cache entry is owned by the node, clearing a write cache remote flag in the write cache.

9. The system of claim 8, wherein continuously owned indicates address ownership by a single node before and after the HA.

10. The system of claim 8, wherein:

continuous ownership of the A2N slice where the write cache journal entry is not owned by the node indicates the entry exists prior to the HA event but journal update ownership is not assigned to the node; and non-continuous ownership of the A2N slice wherein the write cache journal entry is not owned by the node indicates the address owner has sole responsibility of the entry.

11. The system of claim 8, wherein:

non-continuous ownership of the A2N slice where the write cache journal entry is owned by the node indicates both the A2H owner and the WC owner are responsible for the entry; and continuous ownership of the A2N slice wherein the write cache journal entry is owned by the node indicates the entry existed prior to the HA event.

12. The system of claim 8, wherein the operations further comprise:

recovering A2H entries of an A2H table for each node;

detecting addresses that point to a write cache journal entry;

marking the write cache journal entry to begin destage flow upon completion of recovery; and removing the write cache journal entry from the write cache recovery list.

13. The system of claim 12, wherein the operations further comprise:

upon detecting no address points to the write cache journal entry, continuing write flow operations upon completion of recovery.

14. The system of claim 8, wherein the operations further comprise:

accessing write cache entries in the write cache recovery list indicating entries have no A2H reference; and continuing write flow operations according to write cache entry state;

wherein entries having no A2H reference indicate entries in process of asynchronization where A2H is updated with a hash value of a page corresponding to address.

15. A computer program product embodied on a non-transitory computer readable medium, the computer program product including instructions that, when executed by a computer causes the computer to perform operations comprising:
    transmitting all entries of a write cache journal for each node to all the nodes; and
    for each node:
        recovering write cache journal entries and detecting all entries with a logical address owned by the node; and
        performing a recovery operation, comprising:
            for each write cache journal entry, and upon determining the node owns the A2N slice:
            if the A2N slice has been continuously owned by the node, and the write cache journal entry is not owned by the node, marking the entry as write cache remote and all write cache journal updates are requested from a remote WC owner;
            if the A2N slice has not been continuously owned by the node, and the write cache journal entry is not owned by the node, maintaining the entry and continuing write flow operations, marking the entry as WC remote and all journal updates are requested from the remote WC owner and inserting the entry to a write cache recovery list;
            if the A2N slice has not been continuously owned by the node, and the write cache journal entry is owned by the node, inserting the entry to the write cache recovery list; and
            if the A2N slice has been continuously owned by the node and the write cache entry is owned by the node, clearing a write cache remote flag in the write cache.

16. The computer program product of claim 15, wherein continuously owned indicates address ownership by a single node before and after the HA.

17. The computer program product of claim 15, wherein: continuous ownership of the A2N slice where the write cache journal entry is not owned by the node indicates the entry exists prior to the HA event but journal update ownership is not assigned to the node; and
non-continuous ownership of the A2N slice wherein the write cache journal entry is not owned by the node indicates the address owner has sole responsibility of the entry.

18. The computer program product of claim 15, wherein:
non-continuous ownership of the A2N slice where the write cache journal entry is owned by the node indicates both the A2H owner and the WC owner are responsible for the entry; and
continuous ownership of the A2N slice wherein the write cache journal entry is owned by the node indicates the entry existed prior to the HA event.

19. The computer program product of claim 15, wherein the operations further comprise:
    recovering A2H entries of an A2H table for each node;
    detecting addresses that point to a write cache journal entry;
    marking the write cache journal entry to begin destage flow upon completion of recovery;
    removing the write cache journal entry from the write cache recovery list; and
    upon detecting no address points to the write cache journal entry, continuing write flow operations upon completion of recovery.

20. The computer program product of claim 15, wherein the operations further comprise:
    accessing write cache entries in the write cache recovery list indicating entries have no A2H reference; and
    continuing write flow operations according to write cache entry state;
    wherein entries having no A2H reference indicate entries in process of asynchronization where A2H is updated with a hash value of a page corresponding to address.

* * * * *